United States Patent
Susca et al.

(10) Patent No.: US 8,238,612 B2
(45) Date of Patent: Aug. 7, 2012

(54) METHOD AND APPARATUS FOR VISION BASED MOTION DETERMINATION

(75) Inventors: Sara Susca, Minneapolis, MN (US); Kailash Krishnaswamy, Little Canada, MN (US)

(73) Assignee: Honeywell International Inc., Morristown, NJ (US)

( * ) Notice: Subject to any disclaimer, the term of this patent is extended or adjusted under 35 U.S.C. 154(b) by 1014 days.

(21) Appl. No.: 12/200,827

(22) Filed: Aug. 28, 2008

(65) Prior Publication Data

US 2009/0279741 A1 Nov. 12, 2009

Related U.S. Application Data

(60) Provisional application No. 61/050,855, filed on May 6, 2008.

(51) Int. Cl.
*G06K 9/00* (2006.01)
*H04N 7/18* (2006.01)
*G01C 17/00* (2006.01)

(52) U.S. Cl. ......... 382/107; 348/154; 348/155; 702/153

(58) Field of Classification Search ................. 382/107, 382/236, 285; 348/97, 154, 155, 169–172, 348/208.1, 352, 407.1; 702/152, 153; 715/852
See application file for complete search history.

(56) References Cited

U.S. PATENT DOCUMENTS

| | | | |
|---|---|---|---|
| 4,853,775 A | 8/1989 | Rouvrais et al. | |
| 4,969,036 A | 11/1990 | Bhanu et al. | |
| 5,525,882 A | 6/1996 | Asaka et al. | |
| 5,577,130 A | 11/1996 | Wu | |
| 5,845,006 A | 12/1998 | Sumi et al. | |
| 5,867,591 A | 2/1999 | Onda | |
| 5,870,486 A | 2/1999 | Choate et al. | |
| 6,278,906 B1 | 8/2001 | Piepmeier et al. | |
| 6,307,959 B1 * | 10/2001 | Mandelbaum et al. | 382/154 |
| 6,353,678 B1 | 3/2002 | Guo et al. | |
| 6,445,814 B2 | 9/2002 | Iijima et al. | |
| 6,445,983 B1 | 9/2002 | Dickson et al. | |
| 6,614,429 B1 * | 9/2003 | Zhang et al. | 345/420 |
| 6,677,941 B2 * | 1/2004 | Lin | 345/419 |
| 6,704,621 B1 | 3/2004 | Stein et al. | |
| 6,724,930 B1 * | 4/2004 | Kosaka et al. | 382/154 |
| 6,771,810 B1 | 8/2004 | Zhang et al. | |

(Continued)

FOREIGN PATENT DOCUMENTS

EP 1921867 5/2008

(Continued)

OTHER PUBLICATIONS

Agrawal et al., "Rough Terrain Visual Odometry", "Proceedings of the International Conference on Advanced Robotics (ICAR)", Aug. 2007, pp. 1-6.

(Continued)

*Primary Examiner* — Abolfazl Tabatabai
(74) *Attorney, Agent, or Firm* — Fogg & Powers LLC

(57) ABSTRACT

A method for determining motion is provided. The method determines a rotation of an object from a first time to a second time by analyzing a first 2D image obtained at the first time and a second 2D image obtained at the second time. Then, the method determines a translation of the object from the first time to the second time based on the determined rotation, 3D information relating to the first image, and 3D information relating to the second image.

13 Claims, 4 Drawing Sheets

U.S. PATENT DOCUMENTS

| | | | |
|---|---|---|---|
| 6,788,808 | B1 | 9/2004 | Van Overveld et al. |
| 6,950,550 | B1 | 9/2005 | Sumi et al. |
| 7,162,338 | B2 | 1/2007 | Goncalves et al. |
| 7,177,737 | B2 | 2/2007 | Karlsson et al. |
| 7,194,126 | B2 | 3/2007 | Konolige |
| 7,248,968 | B2 * | 7/2007 | Reid .............................. 701/301 |
| 7,280,687 | B2 | 10/2007 | Ban et al. |
| 7,463,340 | B2 * | 12/2008 | Krishnaswamy ............... 356/28 |

FOREIGN PATENT DOCUMENTS

| | | |
|---|---|---|
| GB | 2328280 | 2/1999 |
| WO | 2008000711 | 1/2008 |

OTHER PUBLICATIONS

Diel et al., "Epipolar Constraints for Vision-Aided Inertial Navigation", "Proceedings of the IEEE Workshop on Motion and Video Computing (WACV/Motion'05)", 2005, pp. 221-228, vol. 2, Publisher: IEEE.

Ess et al., "Generalised Linear Pose Estimation", "British Machine Vision Conferenece (BMVC '07)", Sep. 2007, pp. 1-10.

Fischler et al., "Random Sample Consensus: A Paradigm for Model Fitting With Applications to Image Analysis and Automated Cartography", "Communications of the ACM", Jun. 1981, pp. 381-395, vol. 24, No. 6, Publisher: ACM.

Harris et al., "A Combined Corner and Edge Detector", 1988, pp. 147-151, Publisher: The Plessey Company, Published in: United Kingdom.

R. Hartley, "In Defense of the Eight-Point Algorithm", "IEEE Transactions on Pattern Analysis and Machine Intelligence", Jun. 1997, pp. 580-593, vol. 19, No. 6, Publisher: IEEE.

Horn et al., "Closed-Form Solution of Absolute Orientation Using Orthonormal Matrices", "Journal of the Optical Society of America", Jul. 1988, pp. 1127-1135, vol. 5, No. 7, Publisher: Optical Society of America.

Horn, "Closed-Form Solution of Absolute Orientation Using Unit Quaternions", "Journal of the Optical Society of America", Apr. 1987, pp. 629-642, vol. 4, Publisher: Optical Society of America.

Kelly et al., "Combined Visual and Inertial Navigation for an Unmanned Aerial Vehicle", "6th International Conference on Field and Service Robotics ", Jul. 2007, pp. 1-10.

Kelly et al., "An Experimental Study of Aerial Stereo Visual Odometry", "Proceedings of the International Federation of Automatic Controll (IFAC) Symposium on Intelligent Autonomous Vehicles", Sep. 2007, pp. 1-6.

Lowe, D.G., "Distinctive Image Features from Scale-Invariant Keypoints", "International Journal of Computer Vision", 2004, pp. 91-110, vol. 60, No. 2.

Lucas et al., "An Iterative Image Registration Technique With an Application to Stereo Vision", "Proc 7th Intl Joint Conf on Artificial Intelligence (IJCAI)", Aug. 24, 1981, pp. 674-679, Published in: Vancouver, British Columbia.

Mirisola et al., "3D Map Registration Using Vision/Laser and Inertial Sensing", "3rd European Conference on Mobile Robots", Sep. 2007, pp. 1-6.

Mirisola et al., "Trajectory Recovery and 3D Mapping for Rotation-Compensated Imagery for an Airship", "Proceedings of the IEEE/RSJ International Conference on Intelligent Robots and Systems (IROS)", Oct. 2007, pp. 1908-1913, Publisher: IEEE.

Ni et al., "Stereo Tracking and Three-Point/One-Point Algorithms—A Robust Approach in Visual Odometry", "2006 IEEE International Conference on Image Processing", Oct. 2006, pp. 2227-2780, No. 8-11, Publisher: IEEE.

Nister et al., "Visual Odometry", "Proceedings of the 2004 IEEE Computer Society Conference on Computer Vision and Pattern Recognition", Jun. 27, 2004, pp. 652-659, vol. 1, Publisher: CVPR, Published in: Washington D.C.

Nister, David, "Preemptive RANSAC for Live Structure and Motion Estimation", "Proceedings of the Ninthe IEEE International Conference on Computer Vision", 2003, Publisher: IEEE.

Steder et al., "Learning Maps in 3D Using Attitude and Noisy Vision Sensors", "Proceedings of the IEEE/RSJ International Conference on Intelligent Robots and Systems (IROS)", 2007, pp. 1-6, Publisher: IEEE.

Sunderhauf et al., "Stereo Odometry—A Review of Approaches", "Technical Report", Mar. 2007, pp. 1-6, Publisher: Chemnitz University of Technology, Published in: Germany.

Bay, H., T. Tuytelaars, Luc Van Gool, "SURF: Speed Up Robust Features", "Proceedings of the Ninth European Conference on Computer Vision", May 2006.

Tomasi et al., "Shape and Motion From Image Streams—A Factorization Method—Part 3 Detection and Tracking of Point Features", "Technical Report CMU-CS-91-132", Apr. 1991, pp. 1-20.

Bunschoten et al., "Robust Scene Reconstruction from an Omnidirectional Vision System", "IEEE Transactions on Robotics and Automation", Apr. 2003, pp. 351-357, vol. 19, No. 2.

European Patent Office, "Office Action", Feb. 17, 2012, Published in: EP.

European Patent Office, "European Search Report" mailed Feb. 7, 2012, Published in: EP.

Kim et al., "Determining Object Motion in a Sequence of Stereo Images", "IEEE Journal on Robotics and Automation", Dec. 1987, pp. 599-614, vol. 3, No. 6.

Kim et al., "Visual Odometry for Non-overlapping Views Using Second-Order Cone Programming", "Computer Vision a ACCV 2007", Nov. 2007, pp. 353-362.

* cited by examiner

METHOD AND APPARATUS FOR VISION BASED MOTION DETERMINATION

The present application claims the benefit of priority to U.S. Provisional Application Ser. No. 61/050,855, filed on May 6, 2008, which is incorporated herein by reference.

BACKGROUND

An increasing number of applications are seeking navigation solutions that do not rely on Global Navigation Satellite Systems (GNSS) for periodic aiding. Personal indoor navigation and urban navigation are two examples.

Typically navigation aids rely on one or both of two types of navigation aids, incremental and absolute. Incremental navigation is the ability to determine position and attitude with sensors that measure incremental motion. Sensors such as gyroscopes, accelerometers, and odometers are used to mechanize incremental navigation systems. Absolute navigation is the ability to determine position and attitude with sensors that measure the location directly. Sensors such as GNSS, magnetometers, and radio beacons are used to mechanize absolute navigation systems.

The utility of incremental navigation is affected by drift in the localization estimate. In many applications, localization would need to be drift-less to be useful. Hence, many applications use absolute navigation sensors to aid the incremental navigation sensors. Most absolute navigation sensors, however, such as GNSS, need infrastructure to operate properly, and therefore are not guaranteed to be available under some key environmental and terrain conditions. In some cases, both GNSS and magnetometer performance deteriorates in similar environments, leading to a 'black out' in absolute localization and aiding. Examples of such environments include indoors, urban canyons, and under foliage located over a ferro-magnetic structure.

The above issues with localization aiding have prompted many people to develop alternative localization sensors and methods. Examples of such sensor systems are stereo and monocular vision systems, Light Detection and Ranging (LIDARS), and RADARS. Such sensors have been used primarily as incremental navigation systems. There are also an increasing number of prototype systems that detect signals of opportunity such as Wi-Fi and Radio that use triangulation/trilateration to localize a platform. Such systems have also been used as absolute navigation systems.

SUMMARY

The following summary is made by way of example and not by way of limitation. In one embodiment, a method for determining motion is provided. The method determines a rotation of an object from a first time to a second time by analyzing a first 2D image obtained at the first time and a second 2D image obtained at the second time. Then, the method determines a translation of the object from the first time to the second time based on the determined rotation, 3D information relating to the first image, and 3D information relating to the second image.

DRAWINGS

DETAILED DESCRIPTION

Figure 1:
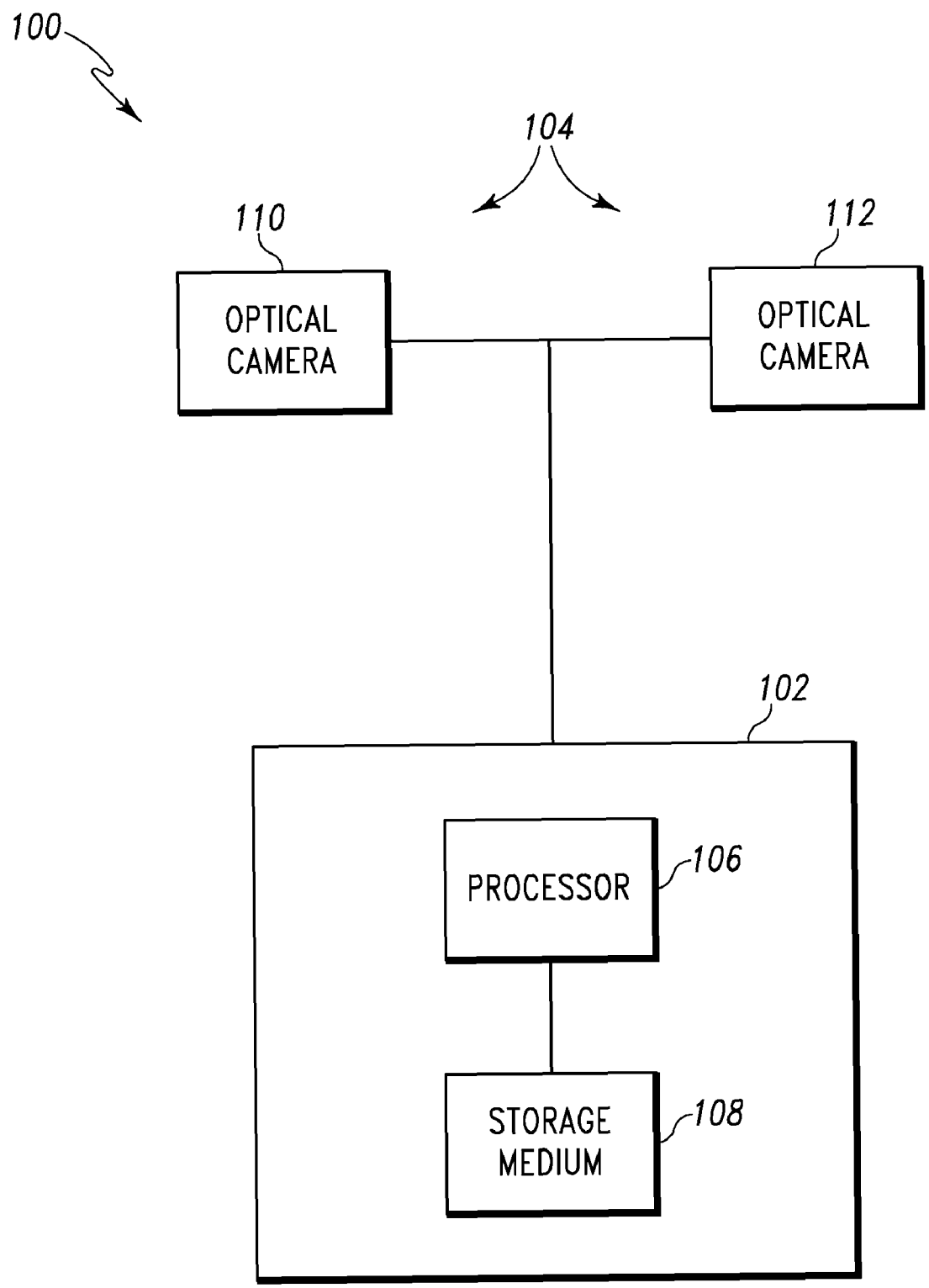
FIG. 1 is block diagram of one embodiment of a system for determining the motion.

FIG. 1 is one embodiment of a system 100 for determining the motion of an object. System 100 includes a processing system 102 and at least one imaging device 104. Processing system 102 may be implemented in various form factors and configuration including, for example, as a portable computer or can be embedded in (or otherwise incorporated in or communicatively coupled to) other electrical systems or devices.

Processing system 102 includes at least one programmable processor 106 (also referred to herein as "processor" 106). In one embodiment, processor 106 comprises a microprocessor. Processor 106 executes various items of software. The software comprises program instructions that are embodied on one or more items of processor-readable media. For example, in one embodiment, processor readable media includes a hard disk drive or other mass storage device local to the processing system 102 and/or shared media such as a file server that is accessed over a network such as a local area network or wide area network such as the Internet. In one embodiment, the software is firmware which is embedded in a storage medium within processor 106. In the embodiment shown in FIG. 1, the software executed by processor 106 is embodied on a storage medium 108 which is communicatively coupled to processor 106.

In the embodiment shown in FIG. 1, imaging devices 104 comprise a first optical camera 110 and a second optical camera 112. Camera 110 is located at a distance from camera 112. This enables images of features taken from camera 110 to have a different perspective than the images taken from camera 112. Thus, the images from camera 110 and camera 112 can be combined to create a 3-dimensional image of a feature. Optical camera 110 and optical camera 112 are positioned such that optical camera 110 and optical camera 112 are focused on the same scene (although from different angles). This is sometimes referred to in the art as a stereo camera system. Stereo camera systems and techniques to combine images from stereo camera systems to create a 3D image are known in the art and are not described in detail herein.

Figure 2:
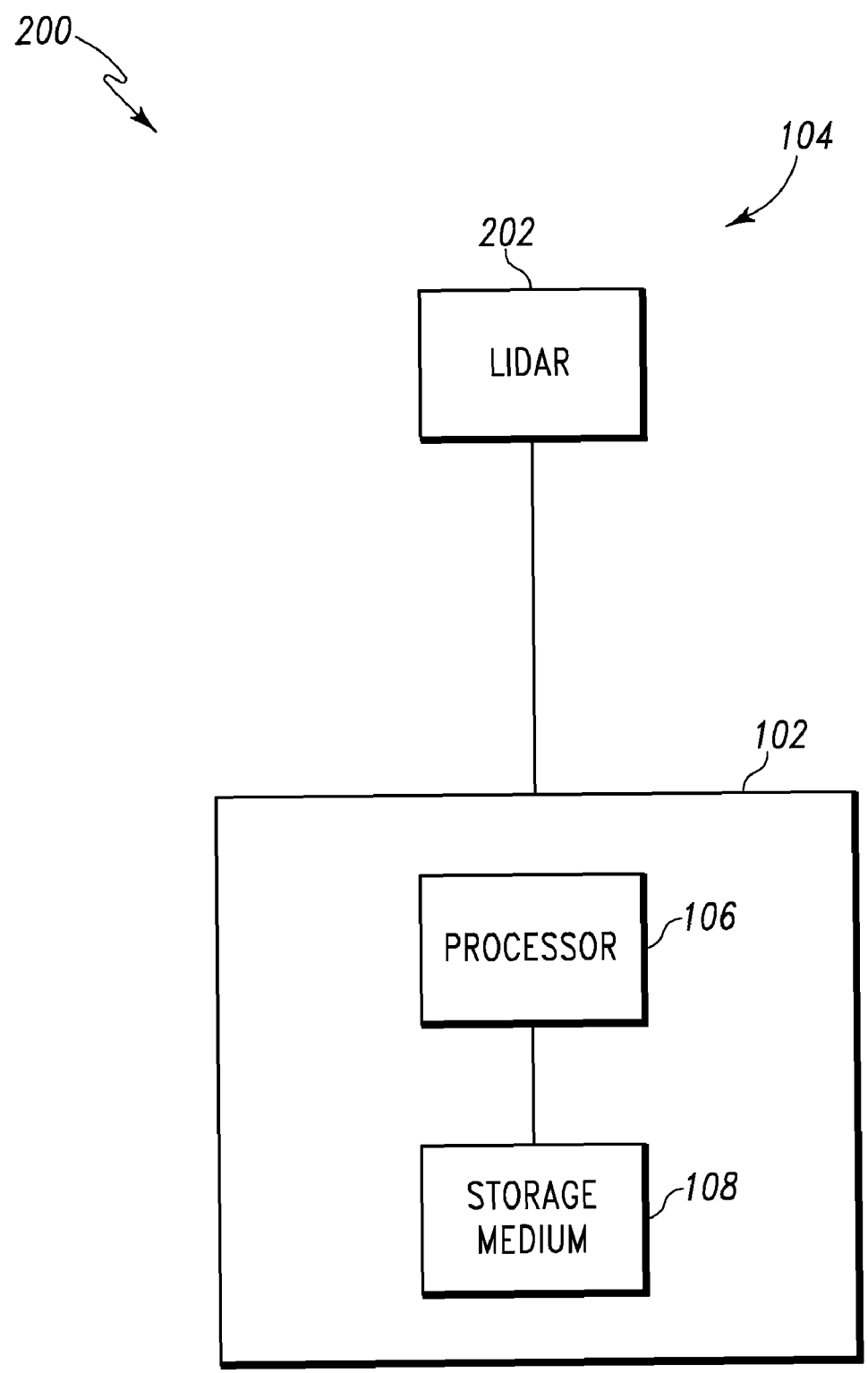
FIG. 2 is a block diagram of another embodiment of a system for determining the motion.

An alternative embodiment of a system 200 for determining the motion of an object is shown in FIG. 2. System 200 is similar to system 100 except that imaging device 104 is a Light Detection and Ranging (LIDAR) 202. LIDAR 202 simultaneously takes an intensity image and a range image of a scene. This enables a 3D image of the scene to be constructed. LIDAR systems are known to those skilled in the art, and are not described in detail herein.

In one embodiment, system 100 is included within a vehicle and used as a navigation aid for the vehicle. For example, in one embodiment system 100 is included within an aircraft. In other embodiments, system 100 is included with a land, or water based vehicle. In yet other embodiment, system 100 is a standalone system.

Figure 3:
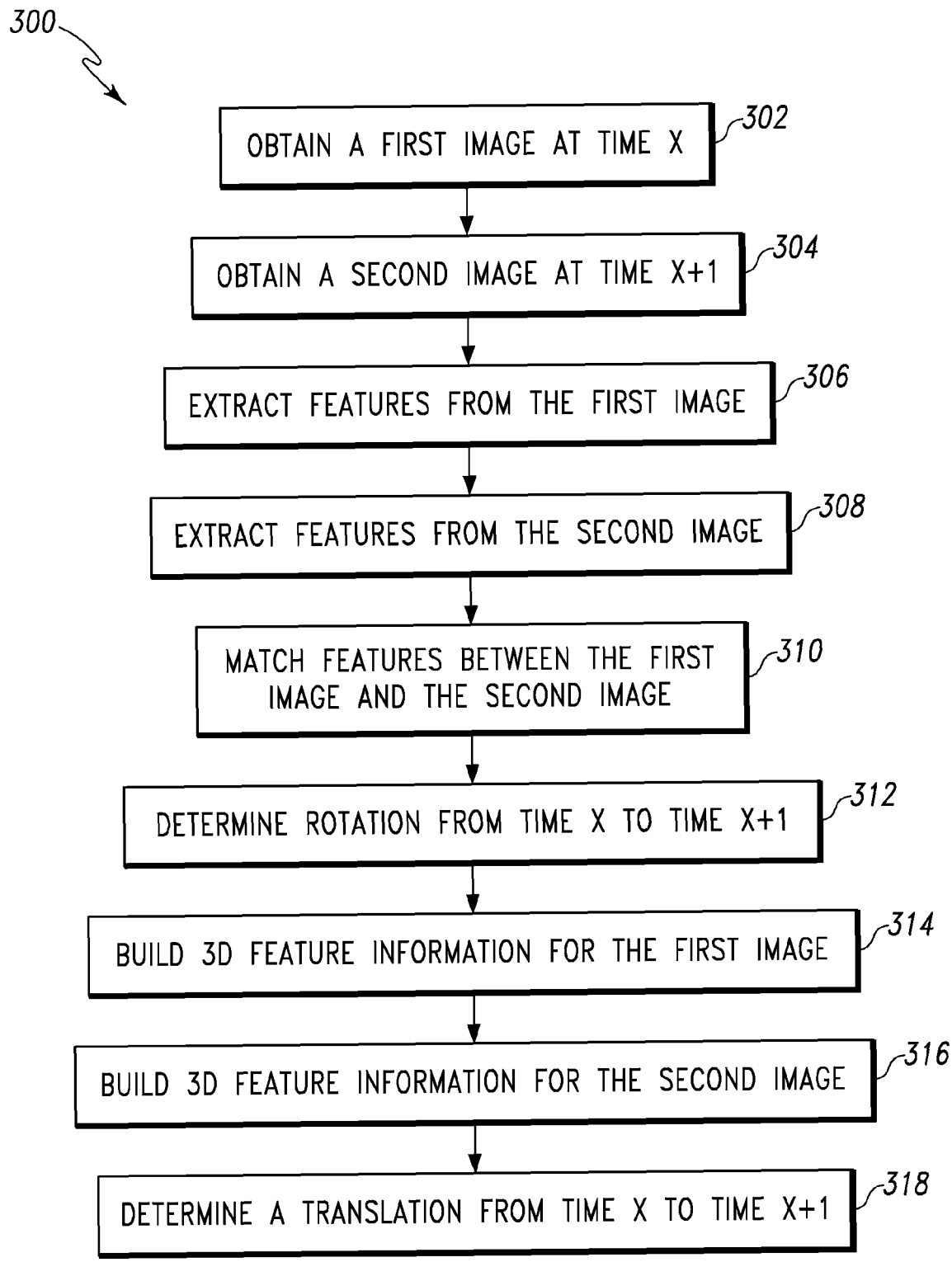
FIG. 3 is a flow chart of one embodiment of a method for determining the motion.

Referring now to FIG. 3, one embodiment of a method 300 for determining the motion of an object is shown. Method 300 uses a vision based system to determine the motion of an object. In one embodiment, method 300 is used to determine the motion of an object upon which imaging device 104 is mounted. Here, imaging device 104 takes images of scenes within the field of view of imaging device 104. In one embodiment, imaging device 104 is mounted on the object and faces in a forward direction (direction of movement) from the object, thus the field of view of imaging device 104 is in front of the object. In other embodiments, imaging device 104 faces below, above, or at other directions relative to the object. In one embodiment, imaging device 104 is mounted in a stationary position relative to the object, such that imaging device 104 moves in conjunction with the object as the object moves. As the object moves, the field of view of imaging device 104 changes. Based on these changes in the images taken of the field of view, system 100 (or system 200) determines the motion of the object.

In another embodiment, instead of determining the motion of an object upon which imaging device 104 is mounted, method 300 is used to determine the motion of an object within the field of view of imaging device 104. For example, in one embodiment, imaging device 104 is mounted in a substantially stationary position. In another embodiment, imaging device 104 is not stationary; however, the movement of imaging device 104 is known and accounted for. Over time, as the object moves through the scene viewed by imaging device 104, imaging device 104 obtains images of the object. Based on the change in position of the object relative to imaging device 104 and/or other features within the scene, the motion of the object is determined.

As referred to above, method 300 determines the motion of an object by comparing images from different points in time and analyzing the changes between the images. The motion of an object from one image to the next image can be separated into the objects rotation between the two images and objects translation between the two images. In one embodiment, two images are used to determine the motion. In another embodiment, more than two images are used to determine the motion.

Method 300 begins by obtaining a first two-dimensional (2D) image of a scene at a first time and a second 2D image of a scene at a second time. The 2D images are compared to determine a rotation between the two images. In one embodiment, an eight-point algorithm is used to determine the rotation between the first 2D image and the second 2D image. In one embodiment, when the object in which system 100 is determining motion for is the object to which imaging device 104 is mounted, the rotation is the rotation of the one entire image with respect to the other image. In other words, when the object to which imaging device 104 is mounted rotates, the entire scene that imaging device 104 views also rotates. In another embodiment, when method 300 is determining the motion of an object within the view of imaging device 100, only a feature or a plurality of features pertaining to the moving object within the images are analyzed to determine rotation.

Once the rotation is determined, the rotation is used along with three-dimensional (3D) information of the scenes to determine the translation of the object. The 3D information is obtained through the use of optical cameras 110, 112 taking images of the same scene or through the use of LIDAR 202. In one embodiment, a modified absolute orientation algorithm is used to determine the translation of the object. The rotation determined from the 2D images and the information from the 3D images is input into the ending steps of the absolute orientation algorithm to determine a translation. Advantageously, determining the rotation from the 2D image while determining the translation from 3D information improves the accuracy of the calculations.

Method 300 begins at step 302 where a 2D image of a scene which is in the view of imaging device 104 is obtained at time X. In step 304, at time X+1 a second 2D image of a scene which is in the view of imaging device 104 is obtained. The first image and the second image are compared to determine the rotation between the first and second image. In order to compare the first image and the second image, features within each of the images identified. Features within first image are then compared to the same features in the second image. As mentioned above, the location, size, and/or perspective of the feature changes as either the feature or imaging device 104 moves. Based on these changes for the feature between the first image and the second image, a rotation is determined for the object. In order to effectively compare features between the first and second image, the first and second image should be taken within an amount of time and have a scene width such that at least one feature from the first image is present in the second image. In one embodiment, the first and second 2D images are taken with either optical camera 110 or optical camera 112. In an alternative embodiment, the first and second images are taken with LIDAR 202. Here, the 2D images are intensity images from LIDAR 202.

At step 306, features are extracted from the first 2D image. Then, in a similar manner at step 308, features are extracted from the second 2D image. In one embodiment, to extract features from a 2D image when the 2D image is an intensity image from a LIDAR the features extracted are point features. In one embodiment, the point features are extracted using a Scale Invariant Feature Transform (SIFT). In another embodiment, the point features are extracted using a Speeded-Up Robust Features (SURF) algorithm. The SIFT and SURF feature extraction algorithms use specific spatial filters (difference of Guassians and Laplacians respectively) at multiple scales of an image to extract features. The output of SIFT and SURF feature extraction algorithms is a list of specific locations and normalized descriptor vectors of length 128 for SIFT, or 64 or 128 for SURF. More detail regarding the SIFT algorithm is provided in the article "Distinctive image features from scale-invariant keypoints" by D. G. Lowe, *International Journal of Computer Vision*, 60, 2 (2004), pp. 91-110 which is hereby incorporated herein by reference. More detail regarding the SURF algorithm is provided in the paper "SURF: Speed Up Robust Features" by H. Bay, T. Tuytelaars, Luc Van Gool, *Proceedings of the ninth European Conference on Computer Vision*, May 2006 which is hereby incorporated herein by reference.

In an alternative embodiment, the point features are extracted using a modified Harris algorithm. The standard Harris algorithm uses gradient filters to extract features. The output is a list of feature pixel locations. More detail regarding the standard Harris function is provided in the paper "A Combined Corner and Edge Detector" by C. Harris, and M. Stephens, *Proceedings of The Fourth Alvey Vision Conference*, Manchester, UK, August-September 1988, pp. 147-151.

The modified Harris algorithm uses a descriptor vector created using pixel intensities in a window around a feature, and normalizes the resulting vector to unity. The length of the descriptor vector is 121 for a selected window size of 11×11 pixels. In one embodiment, every feature within the image is extracted and analyzed.

At block 310, once the features are extracted in both the first image and the second image, the features are matched between the first image and the second image. The matched features are then used to determine motion of the object between time X and time X+1. In one embodiment, the point features are matched between the first image and the second image, the descriptor values associated with each feature are used. In this embodiment, using one of SIFT, SURF, or the modified Harris algorithm, the descriptor is a normalized vector containing information about the image region around the feature.

The descriptor values in the first image are matched with the best match from the feature descriptors in the second image. For example, to match feature A of the first image with a feature in the second image, the matching algorithm calculates the Euclidian distance between the descriptor of feature A and each of the features within the second image. The feature within the second image having the minimum distance from the descriptor of feature A in the first image is selected as the match to feature A. In one embodiment, to reduce the incorrect matches between point features with similar descriptors, the ratio between the minimum distance and second-smallest distance must be below a threshold.

Once the features have been matched, at block 312, an estimation of rotation from the first image to the second image is determined. In one embodiment, prior to rotation estimation, the RANdom SAmple Consensus (RANSAC) algorithm is used to reject outliers. Outliers are sets of point features that do not preserve a unique motion. The RANSAC algorithm is discussed in the article "Random Sample Consensus: A Paradigm for Model Fitting with Applications to Image Analysis and Automated Cartography" by M. A. Fischler, and R. C. Bolles, *Comm. Of the ACM* 24: pg. 381-395, June 1981 which is hereby incorporated herein by reference. In one embodiment, a second rejection step is performed in a refinement algorithm.

Figure 4:
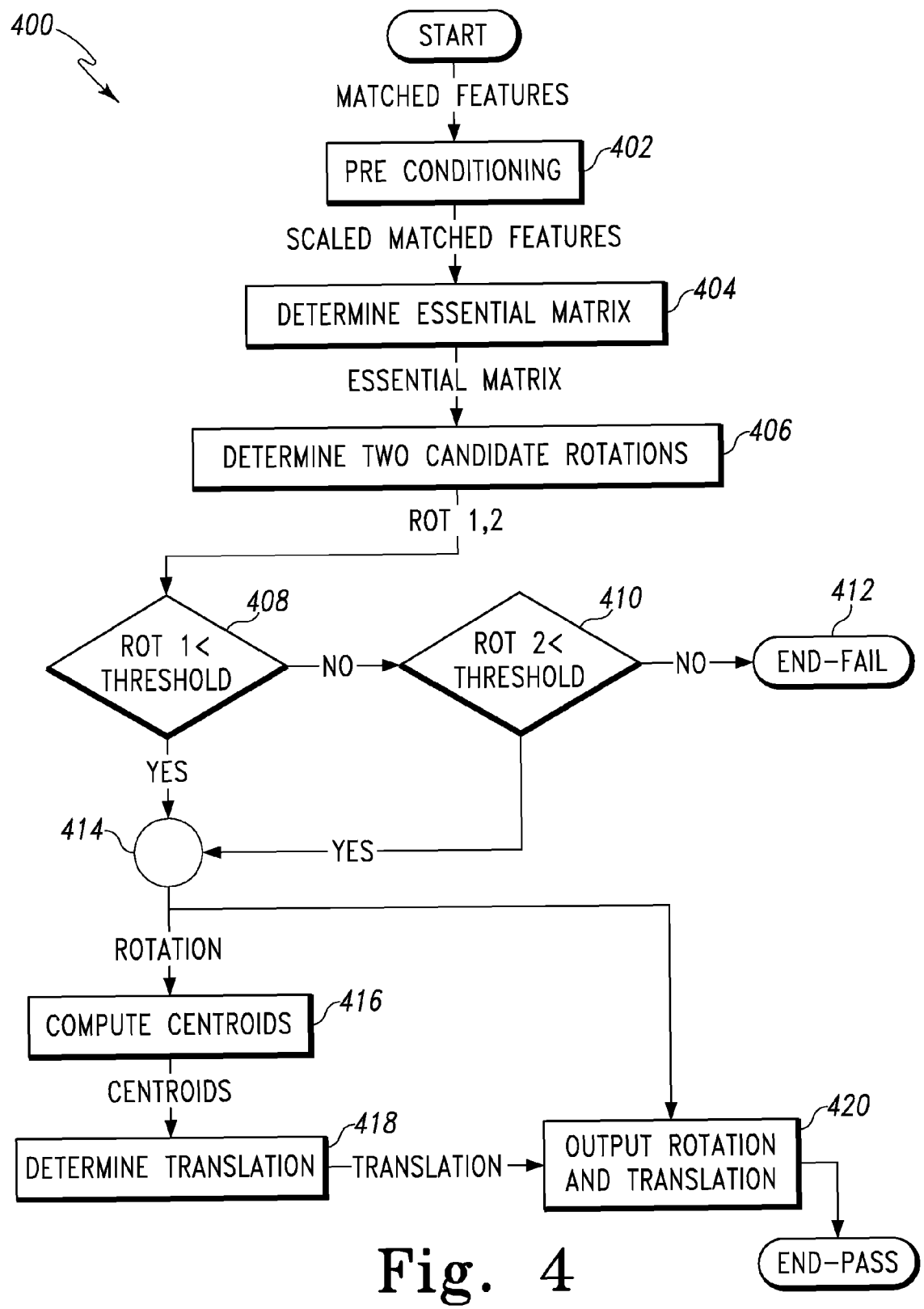
FIG. 4 is a flow chart of another embodiment of a method for determining the motion.

In one embodiment, the rotation is determined by an eight-point algorithm. Steps 402-414 in FIG. 4 illustrate steps from an eight-point algorithm used to determine rotation. The rotation from the eight-point algorithm is then input into a modified absolute orientation algorithm, shown in steps 416-418 to determine translation. In on embodiment, the inputs to the eight point algorithm are two sets of eight matched features from the first and second image. In other words, eight features from the first image were matched with eight features from the second image and those two sets of eight features are input into the eight point algorithm. In other embodiments, sets of more than eight features are input into the eight point algorithm. At block 402, the matched features are pre-conditioned to calculate scaled matched features. These scaled matched features are then used at block 404 to determine the essential matrix. From the essential matrix, at block 406, two candidate rotations are determined. The two rotations are 180 degrees apart. At blocks 408 and 410 each of the candidate rotations is checked and the acute angle of the two angles is selected as the rotation for block 414. In one embodiment, the acute rotation is compared to a threshold (e.g. 20 degrees). If the acute rotation is equal to or below the threshold the acute rotation is used. If the acute rotation is above the threshold, the algorithm is determined to have failed and is exited at block 412. If the algorithm is exited, in one embodiment, the next images in time are input into method 300.

The eight-point algorithm outputs the attitude direction cosine matrix (rotation matrix) between the two images to block 416 for determination of translation and to block 420 for outputting with the determined translation. More detail regarding the eight-point algorithm is provided in the article "In defense of the eight-point algorithm" by R. Hartley, *IEEE Transactions on Pattern Analysis and Machine Intelligence*, Vol. 19, Issue 6, June 1997, pp. 580-593.

The RANSAC algorithm as used with the eight point algorithm randomly selects eight points from the matched points to generate the motion hypotheses. Each motion hypothesis is scored. Scoring is the process of determining if a candidate pair (rotation and translation) meets the error metric within a certain tolerance. The hypothesis with the highest score is considered a crude estimate of the motion. The hypothesis with the highest score is then used as a starting point for a refinement algorithm in which both the 8-point algorithm and absolute orientation are run again. In one embodiment, the refinement algorithm is iterative. Basically, the eight-point algorithm and the absolute orientation are run once to determine the motion hypotheses, and then the iterative refinement occurs. In the iterative refinement, the 8-point algorithm and the absolute orientation are run again using the points that agree with the highest scoring hypotheses. In one embodiment, to determine how many hypothesis should be generated, the following formula is used: $L=\log(p_{in})/\log(1-p_{out}^N)$, where $p_{in}$ is the estimated percentage of inliers, $p_{out}$ is the desired probability of exiting RANSAC with a correct solution, L is the number of necessary trials, and N is the minimum number of points to input into the motion estimate algorithm. For the hybrid eight-point algorithm N=8. More detail regarding refinement algorithms is provided in co-pending U.S. patent application Ser. No. 12/107,722 filed Apr. 22, 2008 entitled "METHOD AND SYSTEM FOR REAL-TIME VISUAL ODOMETRY".

In one embodiment, steps 302-312 are repeated to add robustness to the rotation determination. For example, in one embodiment, steps 302 and 304 are completed once with optical camera 110 to produce a first image and a second image. Then steps 306-312 are completed and a rotation estimate is determined between the first image and the second image. At the same time that optical camera 110 is taking the first image at step 302, optical camera 112 takes a third image. Likewise, at the same time that optical camera 112 is taking the second image at step 304, optical camera 112 is taking a fourth image. Steps 306-312 are then completed with the third and fourth images to determine a second rotation. The first and second rotation are then used to determine a final rotation. In one embodiment, the final rotation is chosen as the best rotation between the first and second rotation, based on for example, noise in the images, previous or future rotation calculations or other criteria. In another embodiment, the final rotation is a composite of the first rotation and second rotation. Here, the first rotation and the second rotation are combined with a Kalman filter. Additionally, in one embodiment, to reduce the number of false matches between features in an image from optical camera 110 and an image from optical camera 112, two additional quality criteria are applied: the epipolar and the disparity constraints. To impose the epipolar constraint the difference of row indices of the two features is required to be within a certain threshold. To impose the disparity constraint, the difference between the column index for the matched features from the image of camera 110 and the image of camera 112 is required to be negative.

In any case, once the rotation between time X and time X+1 is determined, the rotation is used along with 3D information relating to time X and time X+1 to determine the translation between time X and time X+1. At step 314, 3D feature information for the first image is determined. Likewise at step 316, 3D feature information for the second image is determined. 3D feature information is 3D information relating to features in the first and/or second 2D image. In one embodiment, one or more of the features that were matched between the first image and the second image have 3D information built for them. Specifically, a set of 3D feature information is built comprising 3D information for a plurality of features. For example, in one embodiment, 3D feature information is built for three of the matched features between the first image and the second image. In other embodiments, 3D feature information is generated for more than three of the matched features, or for three or more features other than the matched features of the first image and the second image. The 3D feature information is then used to determine the translation between the features. In other embodiments, such as, for example, when the rotation between the third image and fourth image is used, features from the third and fourth images are used to build 3D feature information.

In one embodiment, when optical cameras 110 and 112 are used as imaging device 104, the 3D feature information for the first image features is built up by using information from the first image and the third image. Similarly, the 3D feature information for the second image is built up by using the information from the second image and the fourth image. Generation of 3D information from two 2D images is known to those skilled in the art and is not described in detail herein.

In another embodiment, when LIDAR 202 is used as imaging device 104, the 3D feature information for the first image is built up based on a combination of the intensity and range images from LIDAR 202 at time X. Similarly, the 3D feature information for the second image is built up using the intensity and range images from LIDAR 202 at time X+1. Here, the range pixel in the range image matching the location of the pixel in the intensity image of the point feature is used to build the 3D feature information.

At step 318, a translation between the first image and the second image is determined by using the rotation as determined in step 312 with 3D feature information relating to the first image and the second image. For example, in one embodiment as shown in FIG. 4, the rotation matrix from the eight-point algorithm is input into the end steps of an Absolute Orientation algorithm to calculate the translation between the first image and the second image. The Absolute Orientation algorithm is a closed form solution to the 2-norm minimization problem of relative motion between two sets of matched 3D point clouds. The rotation determined from the eight-point algorithm along with the 3D feature information is used to compute centroids at block 416. From the centroids, the absolute orientation algorithm determines translation at block 418. This translation is then outputted with the rotation determined from the eight point algorithm at block 420. More detail regarding the absolute orientation algorithm is provided in the publication "Closed-form solution of absolute orientation using unit quaternions" by B. K. P. Horn, *Journal of Optical Society of America A*, Vol. 4, Issue 4, 1987, pp. 629, which is hereby incorporated herein by reference. In one embodiment, the RANSAC algorithm discussed above is used to reject outliers. Additionally, in one embodiment an iterative RANSAC algorithm is used. In another embodiment, the feature points selected for use in the absolute orientation algorithm are the same feature points that were used in the eight-point algorithm.

Instructions for carrying out the various process tasks, calculations, and generation of signals and other data used in the operation of the methods described above can be implemented in a program product including software, firmware, or other processor readable instructions. These instructions are typically stored on any appropriate processor readable medium used for storage of processor readable instructions or data structures. Such processor readable media can be any available media that can be accessed by a general purpose or special purpose computer or processor, or any programmable logic device.

Suitable processor readable media may comprise, for example, non-volatile memory devices including semiconductor memory devices such as EPROM, EEPROM, or flash memory devices; magnetic disks such as internal hard disks or removable disks; magneto-optical disks; CDs, DVDs, or other optical storage disks; nonvolatile ROM, RAM, and other like media; any other media that can be used to carry or store desired program code in the form of processor executable instructions or data structures. Any of the foregoing may be supplemented by, or incorporated in, specially-designed application-specific integrated circuits (ASICs) or field programmable gate arrays (FPGAs). When information is transferred or provided over a network or another communications connection (either hardwired, wireless, or a combination of hardwired and wireless) to a processor, the processor properly views the connection as a processor readable medium. Thus, any such connection is properly termed a processor readable medium. Combinations of the above are also included within the scope of processor readable media.

The method of the invention can be implemented in processor readable instructions, such as program modules or applications, which are executed by a data processor. Generally, program modules or applications include routines, programs, objects, data components, data structures, algorithms, and the like, which perform particular tasks or implement particular abstract data types. These represent examples of program code for executing steps of the methods disclosed herein. The particular sequence of such executable instructions or associated data structures represent examples of corresponding acts for implementing the functions described in such steps.

Although specific embodiments have been illustrated and described herein, it will be appreciated by those of ordinary skill in the art that any arrangement, which is calculated to achieve the same purpose, may be substituted for the specific embodiments shown. It is manifestly intended that any inventions be limited only by the claims and the equivalents thereof.

What is claimed is:

1. A method for determining motion comprising:
   determining a rotation of an object from a first time to a second time by analyzing a first two-dimensional (2D) image obtained at the first time and a second 2D image obtained at the second time, the rotation determined with an eight-point algorithm; and
   determining a translation of the object from the first time to the second time based on the determined rotation, three-dimensional (3D) information relating to the first 2D image, and 3D information relating to the second 2D image, wherein determining the translation comprises:
      inputting the rotation determined by the eight-point algorithm into an absolute orientation algorithm; and
      calculating the translation from the determined rotation, the 3D information relating to the first 2D image, and the 3D information relating to the second 2D image.

2. The method of claim 1, further comprising:
   obtaining the first 2D image with a first optical camera; and
   obtaining the second 2D image with the first optical camera.

3. The method of claim 2, further comprising:
   obtaining a third 2D image at the first time with a second optical camera;
   obtaining a fourth 2D image at the second time with the second optical camera;
   building the 3D information relating to the first 2D image based on the first 2D image and the third 2D image; and
   building the 3D information relating to the second 2D image based on the second 2D image and the fourth 2D image.

4. The method of claim 3, further comprising:
   determining a second rotation of at least one feature by analyzing the third 2D image and the fourth 2D image;

determining a final rotation based on the rotation from the first 2D image and the second 2D image and the second rotation from the third 2D image and the fourth 2D image; and wherein determining a translation between the first time and the second time further comprises determining a translation based on the final rotation, 3D information relating to the first 2D image and the third 2D image, and 3D information relating to the second 2D image and the fourth 2D image.

5. The method of claim 1, further comprising:
obtaining the first 2D image with a light detection and ranging (LIDAR) camera; and
obtaining the second 2D image with the LIDAR camera;
wherein intensity images from the LIDAR camera are used as the first 2D image and the second 2D image.

6. The method of claim 5, further comprising:
building the 3D information relating to the first 2D image based on a first intensity image taken at the first time and a first range image taken at the first time;
building the 3D information relating to the second 2D image based on a second intensity image taken at the second time and a second range image taken at the second time.

7. An apparatus for determining motion comprising:
a processor for executing software;
at least one imaging device communicatively coupled to the processor;
a storage medium communicatively coupled to the processor from which the processor reads at least a portion of the software for execution thereby, wherein the software is configured to cause the processor to:
determine a rotation of an object from a first time to a second time by analyzing a first two-dimensional (2D) image obtained at the first time by the at least one imaging device and a second 2D image obtained at the second time by the at least one imaging device or another imaging device, the rotation determined with an eight-point algorithm, and
determine a translation of the object from the first time to the second time based on the determined rotation, three-dimensional (3D) information relating to the first 2D image, and 3D information relating to the second 2D image, wherein the translation is determined by:
inputting the rotation determined by the eight-point algorithm into an absolute orientation algorithm; and
calculating the translation from the determined rotation, the 3D information relating to the first 2D image, and the 3D information relating to the second 2D image.

8. The apparatus of claim 7, wherein the at least one imaging device comprises a first optical camera and a second optical camera, wherein the first optical camera obtains the first 2D image and the second 2D image and the second optical camera obtains a third 2D image at the first time and a fourth 2D image at the second time; and
wherein the software is configured to cause the processor to:
build the 3D information relating to the first 2D image based on the first 2D image and the third 2D image; and
build the 3D information relating to the second 2D image based on the second 2D image and the fourth 2D image.

9. The apparatus of claim 7, wherein the at least on imaging device is a light detection and ranging (LIDAR) camera, and wherein the first 2D image and the second 2D image are intensity images from the LIDAR camera.

10. The apparatus of claim 9, wherein the software is configured to cause the processor to:
build the 3D information relating to the first 2D image based on a first intensity image taken at the first time and a first range image taken at the first time;
build the 3D information relating to the second 2D image based on a second intensity image taken at the second time and a second range image taken at the second time.

11. A program product comprising a processor-readable medium on which program instructions are embodied, wherein the program instructions are operable to:
extract a first set of features from a first two-dimensional (2D) image taken at a first time;
extract a second set of features from a second 2D image take at a second time;
match features from the first set of features with features from the second set of features;
determine a rotation between the first time and the second time based on the matched features, the rotation determined with an eight-point algorithm;
build a first set of three-dimensional (3D) feature information for the first 2D image from information from the first 2D image and other information obtained at the first time;
build a second set of 3D feature information for the second 2D image from information from the second 2D image and other information obtained at the second time; and
determine a translation between the first time and the second time based on the determined rotation, the first set of 3D feature information, and the second set of 3D feature information, wherein the translation is determined by:
inputting the rotation determined by the eight-point algorithm into an absolute orientation algorithm; and
calculating the translation from the determined rotation, the 3D information relating to the first 2D image, and the 3D information relating to the second 2D image.

12. The program product of claim 11, wherein the first 2D image and the second 2D image are obtained with a first optical camera, and a third 2D image is obtained at the first time with a second optical camera and a fourth 2D image is obtained at the second time with the second optical camera; and
wherein the software is configured to cause the processor to:
build the 3D information relating to the first 2D image based on the first 2D image and the third 2D image; and
build the 3D information relating to the second 2D image based on the second 2D image and the fourth 2D image.

13. The program product of claim 11, wherein the first 2D image and the second 2D image are a first intensity image and a second intensity image from a light detection and ranging (LIDAR) camera;
wherein the software is configured to cause the processor to:
build the 3D information relating to the first 2D image based on the first intensity image taken at the first time and a first range image taken at the first time; and
build the 3D information relating to the second 2D image based on the second intensity image taken at the second time and a second range image taken at the second time.

* * * * *